(12) United States Patent
Usuki et al.

(10) Patent No.: US 7,125,928 B2
(45) Date of Patent: Oct. 24, 2006

(54) ADHESIVE COMPOSITION AND THERMAL TRANSFER SHEET

(75) Inventors: Hideki Usuki, Tokyo (JP); Naohiro Obonai, Tokyo (JP)

(73) Assignee: Dai Nippon Printing Co., Ltd., Tokto-To (JP)

( * ) Notice: Subject to any disclaimer, the term of this patent is extended or adjusted under 35 U.S.C. 154(b) by 0 days.

(21) Appl. No.: 10/238,537

(22) Filed: Sep. 10, 2002

(65) Prior Publication Data
US 2003/0055151 A1 Mar. 20, 2003

(30) Foreign Application Priority Data
Sep. 12, 2001 (JP) .............. 2001-277091

(51) Int. Cl.
*C09D 133/12* (2006.01)
*C09D 133/10* (2006.01)
*C09D 125/08* (2006.01)

(52) U.S. Cl. .............. 524/560; 524/562; 524/542; 524/570

(58) Field of Classification Search .............. 524/562, 524/542, 560, 561, 700, 570; 428/195
See application file for complete search history.

(56) References Cited

U.S. PATENT DOCUMENTS

| | | | |
|---|---|---|---|
| 4,033,770 A * | 7/1977 | De Haes et al. ............ | 430/237 |
| 4,156,064 A * | 5/1979 | Falkenstein et al. ........ | 525/453 |
| 4,391,853 A * | 7/1983 | Pointon ...................... | 427/152 |
| 4,492,784 A | 1/1985 | Boultinghouse | |
| 4,912,169 A * | 3/1990 | Whitmire et al. ............ | 525/221 |
| 5,106,676 A * | 4/1992 | Sato et al. .................. | 428/212 |
| 5,700,584 A * | 12/1997 | Suematsu ................. | 428/32.79 |
| 6,503,621 B1 * | 1/2003 | Ma et al. .............. | 428/355 BL |

FOREIGN PATENT DOCUMENTS

| | | | |
|---|---|---|---|
| DE | 4233374 A1 * | 4/1994 | |
| GB | 1462405 | 1/1977 | |
| GB | 1462405 A * | 1/1977 | |
| JP | 05024370 A * | 2/1993 | |
| JP | 11263073 | 9/1999 | |
| JP | 11263073 A * | 9/1999 | |
| JP | 2001039038 | 2/2001 | |
| JP | 2001039038 A * | 2/2001 | |

\* cited by examiner

*Primary Examiner*—David W. Wu
*Assistant Examiner*—Satya B. Sastri
(74) *Attorney, Agent, or Firm*—Timothy J. Keefer; Seyfarth Shaw LLP

(57) ABSTRACT

The present invention provides an adhesive composition comprising a copolymer (a) of a methylmethacrylate (MMA) and/or a butylmethacrylate (BMA) and a styrene (St), also provides an adhesive composition comprising a mixture of an acrylic polymer (b) and a ketone resin, wherein the acrylic polymer (b) is at least one polymer selected from the group consisting of a poly MMA, a poly BMA, a MMA/BMA copolymer or a MMA/BMA/St copolymer, and also provides a thermal transfer sheet having a layer comprising the adhesive composition. The adhesive composition has excellent heat sealing characteristics and resistance to blocking when it is used for the formation of an adhesive layer, is also superior in miscibility with various organic or inorganic additives and allows these additives to exhibit their functions sufficiently when these additives are added and has high transparency.

4 Claims, 1 Drawing Sheet

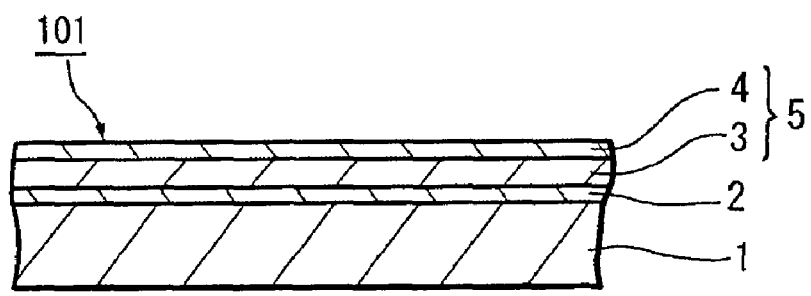
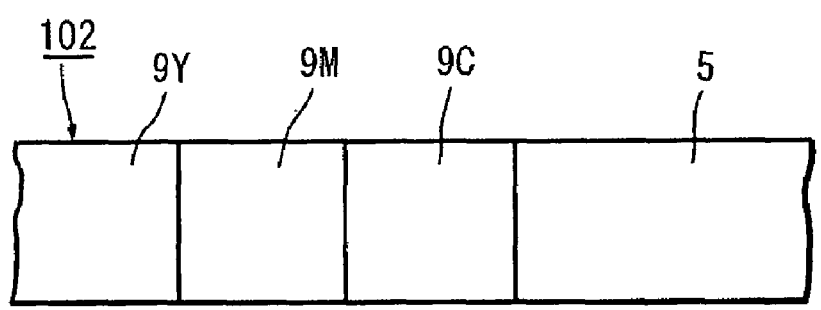
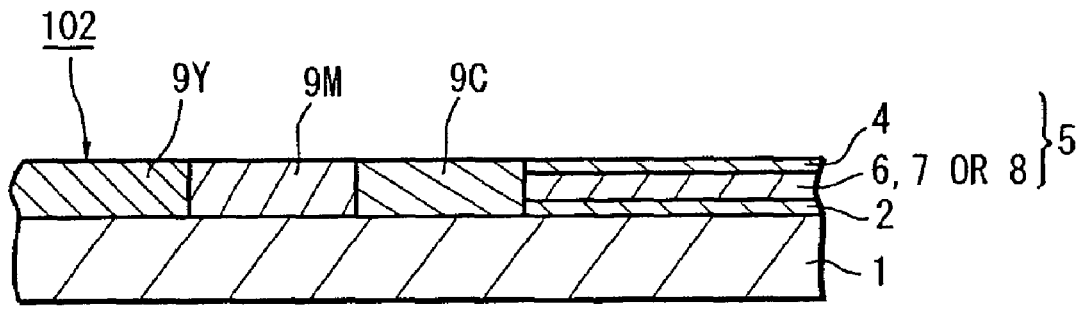

ADHESIVE COMPOSITION AND THERMAL TRANSFER SHEET

BACKGROUND OF THE INVENTION

1. Field of the Invention

The present invention relates to an adhesive composition and a thermal transfer sheet, and, more particularly, to an adhesive composition which has excellent heat sealing characteristics and resistance to blocking when it is used for the formation of an adhesive layer, is also superior in miscibility with various organic or inorganic additives and allows these additives to exhibit their functions sufficiently when these additives are added and has high transparency, and also to a thermal transfer sheet having a layer comprising the adhesive composition.

2. Description of the Related Art

The formation of an image using, for example, a sublimation type thermal transfer system, melt type thermal transfer system or ink jet system has been of very wide prevalence. These systems can form a beautiful image simply and are therefore widely used for printing in a small lot and for personal use.

It is known that in an image formed in the above simple image forming system, neither a strong binder nor a film forming material is usually used unlike the case of general printing systems such as offset printing and gravure printing and the resulting image is therefore inferior in friction resistance, light resistance, weatherability and chemical resistance. As a method of solving such a problem, a method in which a transparent resin layer is formed as a protect layer on the surface of an image is used and a simple method of forming a protect layer, for example, a protect layer thermal transfer system is known.

In the above protect layer transfer system, a transferable transparent resin layer is transferred to and laminated on a desired position of an image by using a protect layer thermal transfer sheet provided with the transparent resin layer on one surface of a substrate sheet. Such a protect layer transfer sheet is generally provided with a heat sealing adhesive layer on the surface of a protect layer so that the protect layer is easily transferred. Further, various additives such as an ultraviolet absorber, silica, polyethylene wax, conductive material and antistatic agent are added to the adhesive layer.

SUMMARY OF THE INVENTION

However, the aforementioned conventional adhesive has a poor affinity to various additives. For instance, it has inferior compatibility with organic additives such as an ultraviolet absorber and wax and is also inferior in the dispersibility of each inorganic particle, causing the adhesive layer to be turbid occasionally and this often leads to deterioration in the quality of an image to be coated. Moreover, the protect layer thermal transfer sheet using a conventional adhesive often gives rise to defects such as blocking owing to an adhesive layer disposed at a position of the outermost layer. Also, a conventional adhesive has insufficient adhesive force and there is therefore the case where the protect layer is peeled off after the protect layer is transferred.

Accordingly, it is an object of the present invention to provide an adhesive composition which has excellent heat sealing characteristics and resistance to blocking when it is used for the formation of an adhesive layer, is also superior in miscibility with various organic or inorganic additives and allows these additives to exhibit their functions sufficiently when these additives are added and has high transparency, and also to provide a thermal transfer sheet having a layer comprising the adhesive composition.

The above object is attained by the present invention shown below. Specifically, the present invention provides an adhesive composition comprising a copolymer (a) of a methylmethacrylate (MMA) and/or a butylmethacrylate (BMA) and a styrene (St). The present invention also provides an adhesive composition comprising a mixture of an acrylic polymer (b) and a ketone resin, wherein the acrylic polymer (b) is at least one polymer selected from the group consisting of a poly MMA, a poly BMA, a MMA/BMA copolymer or a MMA/BMA/St copolymer. The present invention further provides various thermal transfer sheets using the adhesive composition.

BRIEF DESCRIPTION OF THE DRAWINGS

In the accompanying drawings:

FIG. 1 is a cross sectional view schematically showing one example of the protect layer thermal transfer sheet of the present invention;

FIG. 2A is a plane view schematically showing one example of the complex thermal transfer sheet of the present invention; and, FIG. 2B is a cross sectional view schematically showing the same complex thermal transfer sheet of the FIG. 2A.

DESCRIPTION OF THE PREFERRED EMBODIMENT

The present invention will be explained in more detail by way of preferable embodiments.

An adhesive composition of the present invention may contain as an essential adhesive substance, a copolymer (a). The copolymer (a) is one produced by polymerizing at least one acrylic monomer selected from the group consisting of methylmethacrylate (MMA) and butylmethacrylate (BMA) with styrene (St).

The adhesive composition of the present invention may contain as an essential adhesive substance, an acrylic polymer (b), and when the acrylic polymer (b) is used, a ketone resin is mixed therewith. The acrylic polymer (b) is at least one polymer or copolymer selected from the group consisting of a polymethylmethacrylate, a polybutylmethacrylate, a methylmethacrylate/butylmethacrylate copolymer or a methylmethacrylate/butylmethacrylate/styrene copolymer.

The "ketone resin" in the present invention means a synthetic resin obtained by a reaction of a ketone compound with an aldehyde compound and includes acetaldehyde resins, acetone furfural resins or the like. These ketone resins may be available from the market and used in the present invention.

Embodiments of an adhesive composition according to the present invention includes the following structures (wherein "+" means a mixture and "×" means a copolymer):

"NMA"×"St" copolymer;
"BMA"×"St" copolymer;
"MMA"×"BMA"×"St" copolymer;
"Poly MMA"+"ketone resin";
"Poly BMA"+"ketone resin";
"MMA"×"BMA" copolymer+"ketone resin" and
"MMA"×"BMA"×"St" copolymer+"ketone resin".

In the foregoing embodiments, a preferable ratio by weight of an acrylic resin to a ketone resin is as follows: acrylic resin:ketone resin=25 to 30:1 to 5. Also, a preferable ratio by weight of an acrylic monomer to a styrene monomer is as follows:acrylic monomer:styrene monomer=25 to 30:1 to 5. The foregoing copolymer (a) or acrylic polymer (b) preferably has a glass transition temperature (Tg) of 40° C. to 100° C. and more preferably 50 to 90° C. and preferably has a weight average molecular weight of 20000 to 150000 and more preferably 25000 to 130000. When the ratio of monomers, Tg or weight average molecular weight is out of the above each defined range, there is the case where unsatisfactory blocking resistance, adhesion and miscibility with additives are obtained.

The aforementioned copolymer (a) or acrylic polymer (b) used as the adhesive maybe produced using usual methods. Examples of these methods include a method in which an appropriate polymerization initiator is added to the foregoing monomer mixture to carry out solid phase polymerization and also include solution polymerization carried out in a solvent such as methyl ethyl ketone, toluene or a mixture of these solvents, emulsion polymerization carried out by emulsifying a monomer in an aqueous medium and suspension polymerization carried out by suspending a monomer in an aqueous medium. The polymer solution obtained by the solution polymerization in the above method or the polymer solution obtained by emulsion polymerization and suspension polymerization are advantageous because these solutions can be used either as they stand or by adding a ketone resin to form an adhesive layer.

The solid concentration of the above polymer solution is generally about 10 to 40% by weight. This polymer solution contains the copolymer (a) or the mixture of acrylic polymer (b) and the ketone resin, an essential adhesive, and it may further contain additives, as required, such as ultraviolet absorber, silica, polyethylene wax, conductive material and antistatic agent to the extent that the adhesive does not lose its transparency.

For example, the polymer solution may contain ultraviolet absorber in an amount of 0.1 to 70 parts by weight, silica in an amount of 0.1 to 15 parts by weight, polyethylene wax in an amount of 0.1 to 15 parts by weight, conductive material in an amount of 0.1 to 60 parts by weight and antistatic agent in an amount of 0.1 to 15 parts by weight per 100 parts by weight of the essential adhesive.

The adhesive composition of the present invention is useful for various adhesive applications. The adhesive composition of the present invention will be explained taking an example of the composition used for an adhesive layer of a thermal transfer sheet. However, the adhesive composition of the present invention is not limited to the following thermal transfer applications.

(1) Protect Layer Thermal Transfer Sheet

FIG. 1 shows one example of the protect layer thermal transfer sheet. In the FIG. 1, the protect layer thermal transfer sheet 101 has a structure in which a protect layer 3 with thickness of about 0.5 to 10 μm made of a transparent resin such as polyester resin, acrylic resin or the like is disposed on a substrate film 1 excellent in heat resistance such as a polyester film, as required, via a release layer 2 and further an adhesive layer 4 with thickness of about 0.5 to 10 μm comprising the adhesive composition of the present invention is disposed on the surface of the protect layer 3.

In the protect layer thermal transfer sheet 101, a set of the protect layer 3 and the adhesive layer 4 constitutes a transfer layer 5 which is transferable to a surface of a transfer-receiving material which may be provided with an image. The adhesive layer 4 constitutes an outermost layer of the transfer layer. The release layer 2 may be contained in the transfer layer so as to be transferred together with the other layers, or it may be left on the substrate film 1 at the time of transfer process.

The protect layer thermal transfer sheet is overlapped on a surface of an image formed by, for example, a sublimation type thermal transfer system, ink jet system, electrophotographic system or heat-melt transfer system or on a surface of an image formed on a card or the like, in such manner that the adhesive layer faces the image surface. Then, the protect layer thermal transfer sheet is heated from the backside thereof by means of a thermal head, heat plate or heat roll to transfer the adhesive layer and the protect layer on the surface of the image thereby imparting various kinds of durability to the image.

At this time, even if various additives are added to the foregoing adhesive layer, the adhesive layer is uniformly transparent and therefore the quality of the image is not lowered. Also, for formation of the adhesive layer, the copolymer (a) or acrylic polymer (b) having a copolymerization ratio of monomers, Tg and molecular weight each falling in a specified range is selected and an appropriate amount of a ketone resin is combined as required, where by the transferred protect layer is not peeled off with elapse of time and also, no blocking is caused even if the protect layer thermal transfer sheet is wound roll-wise.

(2) Receptor Layer Thermal Transfer Sheet

The receptor layer thermal transfer sheet may has a structure similar to that shown in the FIG. 1 of the protect layer thermal transfer sheet. That is, the receptor layer thermal transfer sheet may has a structure in which a receptor layer comprising a resin receptible a sublimation dye, such as a polyester resin, vinyl chloride/vinyl acetate copolymer or the like, is disposed on a substrate film excellent in heat resistance such as a polyester film, as required, via a release layer and further an adhesive layer with thickness of about 0.5 to 10 μm comprising the adhesive composition of the present invention is disposed on the surface of the receptor layer. In this case, since the adhesive layer is not positioned on an image, it is unnecessary for the adhesive layer to be transparent and therefore a white pigment such as titanium oxide may be added to the adhesive layer.

The above receptor layer thermal transfer sheet serves to make a region allowing the formation of an image in a sublimation thermal transfer system. Specifically, the receptor layer thermal transfer sheet is overlapped on a desired substrate, such as various kinds of paper, synthetic paper, plastic sheets, metals and woods, which is not dyed with a sublimation dye, in such manner that the adhesive layer faces the substrate, and then it is heated from the backside by means of a thermal head, heat plate or heat roll, whereby transferring the adhesive layer and the receptor layer. Also, the use of the adhesive composition of the present invention ensures that the transferred receptor layer is not peeled off with elapse of time and also, no blocking is caused even if the receptor layer thermal transfer sheet is wound roll-wise.

(3) Adhesive Layer Thermal Transfer Sheet (Application to an Intermediate Transfer System or the Like)

The adhesive layer thermal transfer sheet may has a structure similar to that shown in the FIG. 1 of the protect layer thermal transfer sheet. That is, the adhesive layer thermal transfer sheet may has a structure in which a transferable adhesive layer with thickness of about 0.5 to 10 μm comprising the adhesive composition of the present invention is disposed on a substrate film excellent in heat resistance such as a polyester film, as required, via a release layer. The adhesive layer thermal transfer sheet may be used for a so-called intermediate transfer system in which, for example, a desired image is formed on the above receptor layer thermal transfer sheet, the adhesive layer is transferred to either the surface of the receptor layer provided with the image or a desired region of an article to which the receptor layer on which the image is formed is to be transferred and the receptor layer on which the above image is formed is transferred to the surface of the product by making use of the adhesive layer.

Also, the above intermediate transfer system may be a system in which a dye receptor layer is disposed on a transparent substrate film, an image is formed on the receptor layer, the adhesive layer is transferred to the surface of the receptor layer provided with the image from the aforementioned adhesive layer transfer sheet, the receptor layer including the transparent substrate film is applied to the desired article, thereby using the transparent film as a protect layer for the image.

In the other embodiment, the adhesive layer may be transferred beforehand from the adhesive layer thermal transfer sheet to a desired position of the surface of the transfer-receiving article. Then, the dye receptor layer is transferred from the receptor layer thermal transfer sheet to the surface of the adhesive layer fixed on the transfer-receiving article. In this embodiment, the dye receptor layer to be transferred may be already provided with the image or no image. If the dye receptor layer has no image, it is transferred from the receptor layer thermal transfer sheet to the surface of the adhesive layer fixed on the transfer-receiving article, and then the image is formed on the transferred receptor layer.

In this case, since the adhesive layer is not positioned on an image, it is unnecessary for the adhesive layer to be transparent and therefore a white pigment such as titanium oxide may be added to the adhesive layer. The use of the adhesive composition of the present invention ensures that the transferred receptor layer is not peeled off with elapse of time and also, no blocking is caused even if the adhesive layer thermal transfer sheet is wound roll-wise.

Moreover, a protect layer thermal transfer sheet, a receptor layer thermal transfer sheet and an adhesive layer thermal transfer sheet such as those aforementioned may be respectively made into a complex thermal transfer sheet having two or more juxtaposed layers.

One example of the complex thermal transfer sheet is schematically shown in FIGS. 2A and 2B, in which the FIG. 2A is a plane view, and the FIG. 2B is a cross sectional view. In the FIGS. 2A and 2B, the complex thermal transfer sheet 102 has at least one transfer layer 5 which contains the adhesive layer 4 as the outermost layer, any layer selected among the transferable protect layer 6, the transferable receptor layer 7 and the transferable adhesive layer 8 and the release layer 2, and further has at least one colorant layer (9Y, 9M and 9C) intended to desired color such as yellow (9Y), magenta (9M) and cyan (9C), by forming the transfer layer 5 on a part of a substrate film 1 and further forming one or more colorant layers 9Y, 9M and 9C each comprising a sublimation dye in such manner that each layer is arranged alternately and side by side with each other on the same surface of the substrate film.

The present invention as to various transfer sheets as aforementioned is characterized by the use of the adhesive composition of the present invention. Other structures, for example, each structure of the substrate film, a lubricating heat resistant layer formed on the backface of the substrate film, the release layer, the protect layer, the receptor layer and the dye layer may be a known structure and no particular limitation is imposed on these other structures.

The present invention can provide an adhesive composition which has excellent heat sealing characteristics and resistance to blocking when it is used for the formation of an adhesive layer, is also superior in miscibility with various organic or inorganic additives and allows these additives to exhibit their functions sufficiently when these additives are added and has high transparency, and also provide a thermal transfer sheet having a layer comprising the adhesive composition.

EXAMPLES

The present invention will be explained in more detail by way of examples and comparative examples, in which all designations of "parts" and "%" indicate parts by weight and weight percentage (wt. %), respectively, unless otherwise noted.

Examples 1 to 3 and Comparative Examples 1 and 2

A monomer composition shown in the following Table 1 was polymerized using azobisisobutyronitrile as a porimarization initiator in methyl ethyl ketone/toluene (weight ratio: 1/1) at 50 to 90° C. for 5 hours and a ketone resin was added as required to obtain an adhesive solution with a solid concentration of 20%.

TABLE 1

MONOMER COMPOSITION OF ADHESIVE

| Example No. & Abbreviation | | Monomer composition | Mw | Tg |
|---|---|---|---|---|
| Example 1 | H1 | MMA/BMA/St copolymer (weight ratio acrylic:St = 28:2) | 65000 | 75° C. |
| Example 2 | H2 | MMA/BMA copolymer + ketone resin (weight ratio acrylic:ketone = 28:2) | 30000 | 85° C. |
| Example 3 | H3 | MMA/BMA/St copolymer + ketone resin (weight ratio acrylic:St:ketone resin = 25:2:3) | 50000 | 80° C. |
| Comparative Example 1 | H4 | MMA | 120000 | 105° C. |
| Comparative Example 2 | H5 | MMA + BMA | 120000 | 63° C. |

The weight average molecular weight and Tg of the obtained copolymer (a) or acrylic polymer (b) were measured according to the following methods.

<Method of Measuring the Weight Average Molecular Weight>

The molecular weight of the copolymer (a) or acrylic polymer (b) was measured by GPC (gel permeation chromatography) using tetrahydrofuran as a solvent.

<Method of Measuring Tg>

Tg was measured by a commonly known DSC (differential calorimeter).

<Test for Miscibility of the Adhesive Composition with Various Additives>

Additives shown in the following Table 2 were mixed in 100 parts of each of the adhesive solutions H1 to H5 used in the above examples and comparative examples. Then, each solution mixed with the additives was stirred at 30° C. for 60 minutes and then allowed to stand stationarily for 60 minutes to prepare adhesive compositions (A to O) according to the present invention and adhesive compositions (P to Y) of comparative examples. The state of each composition was observed visually. The results are shown in Table 3.

TABLE 2

TYPE OF ADDITIVE

| Additives & Abbreviation | | Content |
|---|---|---|
| Ultraviolet absorber | S1 | Benzophenone type ultraviolet absorber (UVA635L, manufactured by BASF) |
| Ultraviolet absorber | S2 | Benzotriazole type ultraviolet absorber (TINUVIN900, manufactured by Ciba Geigy) |
| Silica | S3 | SYLYSIA 310 (manufactured by Fuji Silysia Chemical Ltd.) |
| Silica | S4 | SYLOSPHERE 1504 (manufactured by Fuji Silysia Chemical Ltd.) |
| Wax | S5 | Polyethylene wax (average particle size: 5 μm) |

TABLE 3

RESULT OF MISCIBILITY TEST

| | Additives | | | | |
|---|---|---|---|---|---|
| Additives | S1 | S2 | S3 | S4 | S5 |
| H1 | A ○ (100) | B ○ (50) | C ○ (3) | D ○ (3) | E ○ (4) |
| H2 | F ○ (100) | G ○ (50) | H ○ (3) | I ○ (3) | J ○ (4) |
| H3 | K ○ (100) | L ○ (50) | M ○ (3) | N ○ (3) | O ○ (4) |
| H4 | P ○ (100) | Q Δ (50) | R x (3) | S Δ (3) | T Δ (4) |
| H5 | U x (100) | V Δ (50) | W Δ (3) | X Δ (3) | Y Δ (4) |

A to Y in the Table 3 are abbreviations of the adhesive compositions. The values in the parenthesis in the table indicate the amount (parts) of the additive per 100 parts of the adhesive solution.

<Criteria for the Evaluation of Miscibility>

○: Precipitation, sedimentation and turbidity do not occur.

Δ: Precipitation, sedimentation and turbidity slightly occur.

x: Precipitation, sedimentation and turbidity occur extremely.

As aforementioned, the adhesive compositions (A to O) of the present invention do not produce turbidity and have high transparency and stability even if additives are added.

Example 4 and Comparative Example 3

The following layers were laminated on one surface of a polyethylene terephthalate film (PET) provided with a heat-resistant lubricating backface layer to make four protect layer thermal transfer sheets (a) to (d).

(a) PET/release layer/protect layer/adhesive layer
(b) PET/protect layer/adhesive layer
(c) PET/release layer/adhesive layer
(d) PET/adhesive layer The adhesive layers of the above thermal transfer sheets (c) and (d) function also as a protect layer. The thickness of each layer of the above protect layer transfer sheets was designed as follows: release layer: 0.5 to 3.0 g/m², protect layer: 0.5 to 5.0 g/m² and adhesive layer: 0.5 to 5.0 g/m². Also, the composition of each layer is as follows.

<Release Layer>

| | |
|---|---|
| Silicone modified acrylic resin (Celtop 226, manufactured by Daicel Chemical Industries, Ltd.) | 16 parts |
| Aluminum catalyst (Celtop CAT-A, manufactured by Daicel Chemical Industries, Ltd.) | 3 parts |
| Methyl ethyl ketone | 8 parts |
| Toluene | 8 parts |

<Protect Layer>

| | |
|---|---|
| Acrylic resin (Thermolack LP45M, manufactured by Soken Chemical & Engineering Co., Ltd.) | 50 parts |
| Methyl ethyl ketone | 25 parts |
| Toluene | 25 parts |

<Adhesive Layer>

Adhesive compositions A to Y described in the aforementioned Table 3

The adhesive compositions A to Y were used in the structures of the above protect layer thermal transfer sheets (a) to (d) to make evaluation. As a result, even if any one of the adhesive compositions A to Y was used in the protect layer thermal transfer sheets (a) to (d), the protect layer was transferred without any problem. However, in the case of the protect layer (adhesive layer) transferred from the protect layer thermal transfer sheets using the adhesive compositions P to Y respectively in the comparative examples, a reduction in transparency (haze) and surface roughness were caused by inferior miscibility of the adhesive composition with the result that the visualization of an image under the protect layer was hindered. On the other hand, no problem arose at all concerning the visualization of an image under the protect layer transferred from the protect layer thermal transfer sheet produced using the adhesive compositions A to O of the present invention.

Example 5 and Comparative Example 4

The following layers were laminated on one surface of a polyethylene terephthalate film (PET) provided with a heat-resistant lubricating backface layer to make two receptor layer thermal transfer sheets (a) and (b).

(a) PET/release layer/receptor layer/adhesive layer
(b) PET/receptor layer/adhesive layer The thickness of each layer of the above receptor layer transfer sheets was designed as follows: release layer: 0.5 to 3.0 g/m², receptor layer: 0.5 to 5.0 g/m² and adhesive layer: 0.5 to 5.0 g/m². Also, the compositions of the release layer and adhesive layer are the same as those of the above Example 4 and the composition of the receptor layer is as follows.

<Receptor Layer>

| | |
|---|---|
| Vinyl chloride/vinyl acetate copolymer resin (1000ALK, manufactured by Denka Vinyl) | 100 parts |
| Epoxy modified silicone (X-22-3000T, manufactured by Shin-Etsu Chemical Co., Ltd.) | 10 parts |
| Methyl ethyl ketone | 10 parts |
| Toluene | 25 parts |

The adhesive compositions A to Y were used in the structures of the above receptor layer thermal transfer sheets (a) and (b) to make evaluation. As a result, in the case of those obtained by using the adhesive compositions A to Y in each structure of the receptor layer thermal transfer sheets (a) and (b), the receptor layer was transferred without any problem. However, in the case of transfer of the receptor layer by using the receptor layer thermal transfer sheets using the adhesive compositions P to Y respectively in the comparative examples, a reduction in the transparency and surface roughness were caused by inferior miscibility of the adhesive composition with the result that haze and appearance inferior due to lines were caused on the image formed on the receptor layer, so that the outward appearance was impaired. On the other hand, no problem arose at all concerning the formation of an image on the receptor layer transferred when using the receptor layer transfer sheets using the adhesive compositions A to O of the present invention respectively.

Example 6 and Comparative Example 5

A full-color image was formed using a sublimation thermal transfer system on the same receptor layer thermal transfer sheet a' which is the same as that of Example 5 except that no adhesive layer was formed. Then the adhesive layer was transferred from the thermal transfer sheet (c) of Example 4 to the surface on which the image was formed. This image was retransferred to the surface of a desired transfer-receiving material by means of a laminator.

As a result, even if any one of the adhesive compositions A to Y was used for the formation of the adhesive layer, the image was retransferred without any problem. However, in the case of using the adhesive compositions P to Y respectively in the comparative examples, a reduction in the transparency and surface roughness were caused by inferior miscibility of the adhesive composition with the result that haze and appearance inferior due to lines were caused under the transferred image, so that the outward appearance was impaired. On the other hand, neither haze nor lines was observed in the case of using the adhesive compositions A to O of the present invention respectively and no problem arose concerning image qualities.

What is claimed is:

1. An adhesive composition comprising a copolymer of methylmethacrylate, butylmethacrylate and styrene, wherein Tg of the copolymer is 40° C. to 100° C. and the weight average molecular weight of the copolymer is 20000 to 150000, and wherein the adhesive composition is heat sensitive and allows one or more portions of a substrate to which the adhesive composition is applied to substantially avoid adherence, when the one or more portions are in overlying position with one another, and wherein the copolymer has a ratio by weight of acrylic monomer including a methylmethacrylate and a butylmethacrylate to a styrene monomer (acrylic monomer:styrene monomer) is in a range of 25 to 30:1 to 5.

2. The adhesive composition according to claim 1, the adhesive composition comprising at least one additive selected from the group consisting of an ultraviolet absorber, silica, polyethylene wax, a conductive material and an antistatic agent.

3. An adhesive composition comprising a mixture of an acrylic polymer and a ketone resin in a ratio by weight of about 25 to 30: about 1 to 5, wherein the acrylic polymer is at least one copolymer selected from the group consisting of methylmethacrylate/butylmethacrylate copolymer and methylmethacrylate/butylmethacrylate/styrene copolymer, and wherein the adhesive composition is heat sensitive and allows one or more portions of a substrate to which the adhesive composition is applied to substantially avoid adherence, when the one or more portions are in overlying position with one another, and wherein the Tg of the acrylic polymer is 40° C. to 100° C. and the weight average molecular weight of the acrylic polymer is about 20,000 to 150,000.

4. The adhesive composition accordingly to claim 3, the adhesive composition comprising at least one additive selected from the group consisting of an ultraviolet absorber, silica, polyethylene wax, a conductive material and an antistatic agent.

* * * * *